(12) United States Patent
Maskey et al.

(10) Patent No.: US 7,860,719 B2
(45) Date of Patent: Dec. 28, 2010

(54) DISFLUENCY DETECTION FOR A SPEECH-TO-SPEECH TRANSLATION SYSTEM USING PHRASE-LEVEL MACHINE TRANSLATION WITH WEIGHTED FINITE STATE TRANSDUCERS

(75) Inventors: Sameer Raj Maskey, New York, NY (US); Yuqing Gao, Mount Kisco, NY (US); Bowen Zhou, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/506,981

(22) Filed: Aug. 19, 2006

(65) Prior Publication Data

US 2008/0046229 A1 Feb. 21, 2008

(51) Int. Cl.
G10L 21/00 (2006.01)
G10L 15/28 (2006.01)
G06F 17/28 (2006.01)

(52) U.S. Cl. .................. 704/277; 704/4; 704/5; 704/257

(58) Field of Classification Search ........... None
See application file for complete search history.

(56) References Cited

U.S. PATENT DOCUMENTS

| | | | |
|---|---|---|---|
| 6,985,863 B2* | 1/2006 | Itoh et al. | 704/257 |
| 2003/0110023 A1* | 6/2003 | Bangalore et al. | 704/5 |
| 2007/0016401 A1* | 1/2007 | Ehsani et al. | 704/9 |
| 2007/0078642 A1* | 4/2007 | Weng et al. | 704/4 |
| 2007/0179777 A1* | 8/2007 | Gupta et al. | 704/9 |

FOREIGN PATENT DOCUMENTS

JP 2006099208 A * 4/2006

OTHER PUBLICATIONS

Watanabe, T. JP 2006099208A Machine Translation.*
Brown, P.F., et al., "The Mathematics of Statistical Machine Translation: Parameter Estimation, Computation Linguistics," vol. 19, No. 2.
Charniak, E., et al., "Edit Detection and Parasing for Transcribed Speech," Proc. of NAACL, 118-126.
Heeman, P.A., et al., "Combining the Detection and Correction of Speech Repairs," Proc. Of ICSLP, 363-365.
Honal, M., et al., "Correction of Disfluencies in Spontaneous Speech Using a Noisy Channel Approach," Eurospeech 2003.
Honal, M., et al., "Automatic Disfluency Removal of Recognized Spontaneous Speech Rapid Adaption to Speaker Dependent Disfluences," ICASSP 2005.
Johnson, M. et al., "A Tage-Based Noisy Channel Model of Speech Repairs," Proc. of ACL, 33-39.

(Continued)

*Primary Examiner*—Matthew J Sked
(74) *Attorney, Agent, or Firm*—F. Chau & Associates, LLC (57) ABSTRACT

A computer-implemented method for creating a disfluency translation lattice includes providing a plurality of weighted finite state transducers including a translation model, a language model, and a phrase segmentation model as input, performing a cascaded composition of the weighted finite state transducers to create a disfluency translation lattice, and storing the disfluency translation lattice to a computer-readable media.

13 Claims, 4 Drawing Sheets

OTHER PUBLICATIONS

Johnson, M., et al., "An Improved Model for Recognizing Disfluencies in Conversational Speech," RT04.

Jason Eisner, et al., "Parameter Estimation for Probabilistic Finite-State Transducers," Proc. of the 40th meeting of the Association for Computational Linguistics.

Kim, J., et al., "Detecting Structural Metadata With Decision Trees and Transformation-Based Learning," Proc. Of HLT/NAACL.

Liu, Y., et al., "The ICSI-SRI-UW Metadata Extraction Systems," ICLSP, 2004.

Spiker, J., et'al., "Processing Self Corrections in a Speech to Speech System;" Proc of 18th Conference in Computational Linguistics.

Snover, M., et al., "A Lexically Driven Algorithm for Disfluency Detection," Short Paper Proc. Of HLT-NAACL 2004.

Shriberg, E., et al., "A Prosody Only Decision Tree Model for Disfluency Detection," Proc. Of Eurospeech 1997.

Shribert, E., et al., Preliminaries to a Theory of Speech Disfluencies, PHD., Thesis.

Stolcke A., et al., Automatic Detection of Sentence Boundaries and Disfluencies Based on Recognized Words, Proc. Of ICSLP 1998.

Tufis, D., et al., "Tagging Romanian Text: A Case Study for QTAG, a Language Independent Probabilistic. Tagger," LREC, 1998.

\* cited by examiner

DISFLUENCY DETECTION FOR A SPEECH-TO-SPEECH TRANSLATION SYSTEM USING PHRASE-LEVEL MACHINE TRANSLATION WITH WEIGHTED FINITE STATE TRANSDUCERS

This invention was made with government support under Contract No. NBCH2030001 awarded by Defense Advanced Research Projects Agency (DARPA). The government has certain rights in this invention.

BACKGROUND OF THE INVENTION

1. Technical Field

The present invention relates to speech recognition, and more particularly a system and method for detecting disfluency.

2. Discussion of Related Art

Disfluency is common in speech. Detecting disfluency in speech can be useful for readability of speech transcripts as well as for further processing by natural language models such as summarization, machine translation or parsing.

There has been a significant amount of work in disfluency detection. Some of the disfluency detection systems have been built pertaining to DARPA EARS Rich Transcription program. Most of the disfluency detection systems that have been proposed use combinations of prosodic and lexical features though some systems are lexically driven without any use of acoustic features.

The addition of prosodic features to word based features has some advantages. For example, usually the intonation of a speaker is disrupted at the interruption point that indicates some form of restart. Another advantage of using prosodic features is its utility in disfluency detection for languages that lack adequate natural language tools.

Even though the use of combined lexical and prosodic features has some clear advantages, it should be noted that the prosodic features are not always easily available for some specific applications. Especially for online systems such as speech-to-speech translation any additional delay added for extra processing of speech signal to obtain various acoustic features may degrade the overall user experience.

Therefore, a need exists for a system and method for disfluency detection.

SUMMARY OF THE INVENTION

According to an embodiment of the present disclosure, a computer-implemented method for creating a disfluency translation lattice includes providing a plurality of weighted finite state transducers including a translation model, a language model, and a phrase segmentation model as input, performing a cascaded composition of the weighted finite state transducers to create a disfluency translation lattice, and storing the disfluency translation lattice to a computer-readable media.

The cascaded composition fuses heterogeneous information of the weighted finite state transducers.

The method includes coupling the disfluency translation lattice to a decoder for receiving noisy speech and outputting cleans speech corresponding to the noisy speech.

The clean speech is output comprising disfluent class label tokens replacing disfluent speech, wherein the noisy speech has the same number of words as the clean speech, and wherein the tokens include tags identifying a type of disfluency. The type of disfluency indicates one of a repeat, a repair, and a filler.

According to an embodiment of the present disclosure, a speech-to-speech translation system includes a source speech input, and a decoder for performing a translation from a language of the source speech input, including disfluency translation based on a weighted finite state transducer model.

The system includes a disfluency translation lattice coupled to the decoder. The system includes a source language model coupled to the decoder, a target language model coupled to the decoder, and a translation lattice coupled to the decoder.

The decoder outputs a target language speech in textual form, wherein disfluent speech is represented by tokens. The system includes a text-to-speech module for receiving the target language speech in textual form and converting the target language speech in aural form.

According to an embodiment of the present disclosure, a program storage device is provided readable by computer-processor, tangibly embodying a program of instructions executable by the computer-processor to perform method steps for creating a disfluency translation lattice. The method includes providing a plurality of weighted finite state transducers including a translation model, a language model, and a phrase segmentation model as input, performing a cascaded composition of the weighted finite state transducers to create a disfluency translation lattice, and storing the disfluency translation lattice to a computer-readable media coupled to the computer-processor.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

Disfluency is common in speech. Detecting disfluency in speech can be useful for readability of speech transcripts as well as for further processing by natural language models such as summarization, machine translation or parsing. The removal of disfluency improves speech-to-speech translation. According to an embodiment of the present disclosure, a disfluency removal system may be coupled with a speech-to-speech translation system such that the translated speech is free of disfluent words and phrases.

According to an embodiment of the present disclosure, a method for detecting disfluency in speech implements a phrase-level statistical machine translation using weighted finite state transducers (WFST). The disfluency detection task is approached as a translation of noisy speech to clean speech. A translation framework implementing the disfluency detection does not need fertility and alignment models (for example, see FIGS. 1 and 2).

Figure 1:
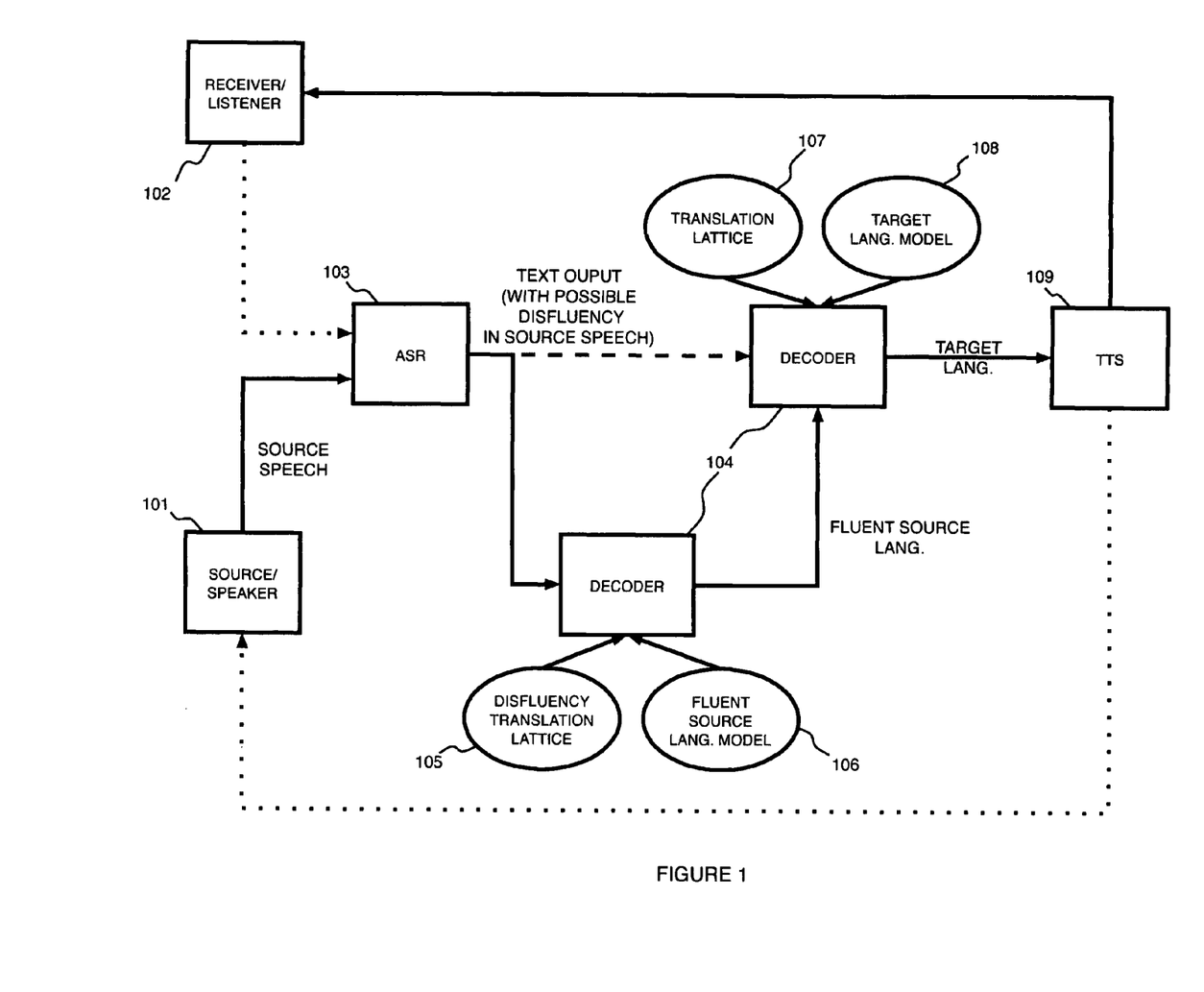
FIG. 1 is a system for speech-to-speech translation including a disfluency translation lattice according to an embodiment of the present disclosure.
Figure 2:
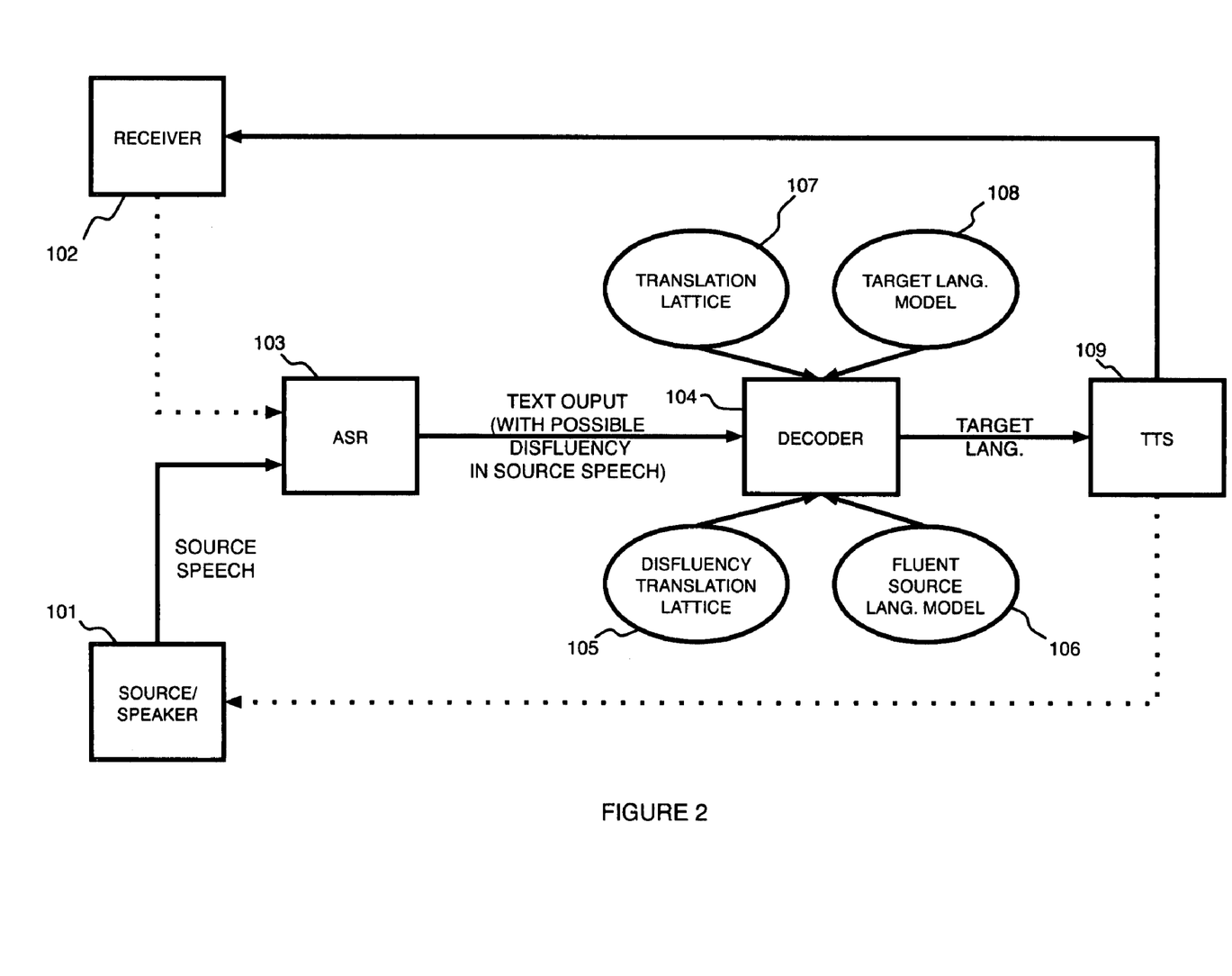
FIG. 2 is a system for speech-to-speech translation including a disfluency translation lattice according to an embodiment of the present disclosure.

Referring to FIGS. 1 and 2, an exemplary translation system comprises a source (101) of speech and a receiver (102)

of translated speech. The system includes an automatic speech recognition engine (103) a decoder (104) and a text to speech engine (109). The decoder (104) may be coupled to one or more lattices for translation, e.g., a disfluency lattice (105) and/or a translation lattice (107). The decoder (104) is further coupled to modules including a fluent source language model (106) and a target language model (108). The decoder performs translation of words and phrases from the source language of the source speech to a target language to be received by, for example, a listener (102). The decoder (104) may implement multiple lattices in multiple passes (for example, see FIG. 1) or as a single pass (for example, see FIG. 2).

Tests have been preformed on the Switchboard disfluency-annotated corpus. The testing included detecting repeats, repairs and filled pauses for more than a thousand sentences. The use of weighted finite state transducer allows for integrating the disfluency detection module in a speech-to-speech translation system with a composition operation resulting in a system that can translate and remove disfluency with one pass decoding.

Disfluency may be divided into three components: reparandum (the words that are repaired), interregnum (filler words or filled pauses) and resumption (the new set of words that repair the reparandum). Three types of disfluencies are detected: repeats (reparandum edited with the same sequence of words), repairs (reparandum edited with different sequence of words) and filled pauses (words in interregnum region). For example, consider the following:

TABLE 1

Example of Disfluencies

| | |
|---|---|
| Repeats | I want to buy three glasses |
| | * three glasses of tea |
| Repairs | I want to buy three glasses |
| | * no five cups of tea |
| Fillers | I want to buy three glasses |
| | * umm four glasses please |

Fillers are placed at the interruption point of the speaker's turn. Fillers include filled pauses such as 'um', 'uh', 'well'; discourse markers such as 'well', 'then', 'you know' and editing terms. The filled pauses may serve to signal hesitation or confusion by the speaker or to signify change in a given topic of conversation depending on the type of filled pause a speaker uses. In Table 1 'umm' is a filled pause placed at the interruption point '*'.

Repeats are one of the most common types of disfluencies. In the above example in Table 1, 'three glasses' is a repeat. Any such occurrences of verbatim repetition of a portion of a spoken utterance are 'repeats'. Repairs may signify confusion in the speaker. In the above example in Table 1, the speaker is confused if he/she wants to order 'three glasses' or 'five cups' of tea. The phrase 'three glasses' is reparandum, which is repaired with 'five cups' after the interruption point. Repairs may also signify hesitation of the speaker.

Disfluency removal may be viewed as a process that transforms the "noisy" disfluent transcript into a "clean" one. Such a transformation can be described using statistical machine translation models.

The disfluency component (105) may be integrated with other finite state transducer (FST)-based components such as a machine translation engine (107) by a FST composition operation providing a unified search space for disfluent speech translation. High speed and memory efficiency may be achieved using an optimized decoder for phrase-based statistical machine translation.

Translation Model

Based on a source channel model approach to statistical machine translation, translating a foreign token sequence $n_1^j$ to a target token sequence $c_1^i$ can be viewed as a stochastic process of maximizing the joint probability of p(n,c) as stated in the Eq. 1.

$$c = \arg \max_{c_1^i} Pr(n_1^j, c_1^i) \qquad (1)$$

The joint probability can be obtained by summing over all the hidden variables that can be approximated by maximization. For machine translation purposes these random variables take account of alignment, permutation, and fertility models.

Disfluency detection is taken as a translation from noisy token sequence to a clean token sequence $n_1^j := n_1, n_2, \ldots n_j$. Since the removal of disfluency will entail removal of words from $c_1^i := c_1, c_2, \ldots c_i$, alignment and fertility models are used as I<J.

The training of the disfluency translation model (105) may be simplified by retokenizing the $c_1^i$ sequence. Instead of clean speech transcript without any disfluent words, a tag is appended that signifies the type of disfluency for each disfluent word in $n_1^j$. This retokenization produces $c_1^i$ with the same number of words as such that $n_1^i$. The retokenization of the previous example of repair in Table 1 produces the following parallel text.

Noisy Data: I want to buy three glasses no five cups of tea
Clean Data: I want to buy REPAIR0 REPAIR1 FP0 five cups of tea These modifications to the machine translation model simplify the model in the following ways: i) no fertility model is used since the number of words in clean and disfluent speech are equal and words in noisy speech transcript can neither go to null nor generate more than one word, ii) with disfluent words retokenized (I=J) a perfect alignment is achieved between the noisy and clean transcripts in the parallel corpora, removing the need of alignment model.

The above approaches for simplifying the translation model reduce the data sparsity problems in machine translation methods. Instead of removing disfluent words all together, the model produces tags describing the type of disfluency that may be useful for further processing by other natural language processing modules such as detecting intonational boundaries.

Phrase Level Translation

Repeats and Repairs may be difficult to detect because reparandum of these disfluencies can be more than one word. In the example in Table 1 the reparandum is "three glasses"—a two word phrase. Reparandum phrase can be of any length though phrases longer than five words are very unlikely. Word-based disfluency detection methods have difficulty in detecting such disfluent phrases because the classifier not only has to classify words as disfluent but also has to detect the start and end boundaries of the reparandum. This added complexity in repeat and repair detection can be addressed assuming that disfluency occurs in phrases. By defining a phrase as a sequence of one or more words, single word disfluency are also addressed with such phrase assumption.

To detect repairs and repeats at the phrase level a phrase level translation model is built. The phrase level translation model is built in a process including techniques for phrase pair extraction, the phrase translation model estimation, and the WFST implementations. The process also includes techniques to determinize and minimize the transducers to optimize the search procedure. Since bi-text alignment is a perfect one-to-one mapping, the phrase pair extraction procedure in this study is straightforward, and the only variable to consider is the phrase length limit.

The length limit on the phrase size makes a significant difference in the size of the dictionary. A maximum phrase size is selected, e.g., five as 99.9% of the disfluent phrase were smaller than five words in the training corpus.

The phrase segmentation may be denoted by introducing a hidden variable $p_1^k$ to the Eq. 2 summing over the joint probability. In addition, the sum may be approximated over the hidden variables using a maximum operator.

$$c = \operatorname{argmax}_{c_1^j} \sum_{p_1^k} Pr(p_1^k, n_1^j, c_1^j) \quad (2)$$

$$\approx \operatorname{argmax}_{c_1^j} \sum_{p_1^k} Pr(p_1^k, n_1^j, c_1^j) \quad (3)$$

Weighted Finite State Transducer Implementation

Eq. 2 may be implemented using weighted finite state transducers. Using the chain rule the joint probability may be decomposed into a chain of conditional probabilities as follows:

$$Pr(p_1^k, n_1^j, c_1^i) = P(c_1^i) \quad (4)$$

$$P(p_1^k | c_1^i) \quad (5)$$

$$P(n_1^j | p_1^k, c_1^i) \quad (6)$$

The conditional probabilities of Eq. 4, 5 and 6 are determined by using the parallel corpus and the phrase dictionary. Furthermore, a WFST is built for each probability distribution modeling the input and output—L, N, and P, where L is a language model, N is the translation model, and P is the phrase segmentation model, respectively.

The arc probabilities for the translation model N are determined by computing the relative frequencies from the collected phrase pairs.

$$P(c | n) = \frac{N(c, n)}{N(c)} \quad (7)$$

where $N(c,n)$ is the number of times a clean phrase c is translated by a noisy phrase n. Eq. 7 overestimates the probabilities of rare phrases. To take account of such overestimation the translation probability is smoothed by performing a delta smoothing. A small numerical quantity δ is added on the numerator and $\delta.|V|$ is added on the denominator where V is the size of the translation vocabulary for a given phrase.

The language model plays a role in a source channel model. The language model L is a trigram language model with the n-gram probability determined from the clean corpus that has disfluent words tagged as REPEAT, REPAIR and FP (filled pauses). In other words, the annotated side of the parallel corpus is used as the language model training data. A back-off 3-gram language model is built and encoded as a weighted acceptor to be employed by the translation decoder.

Figure 3:
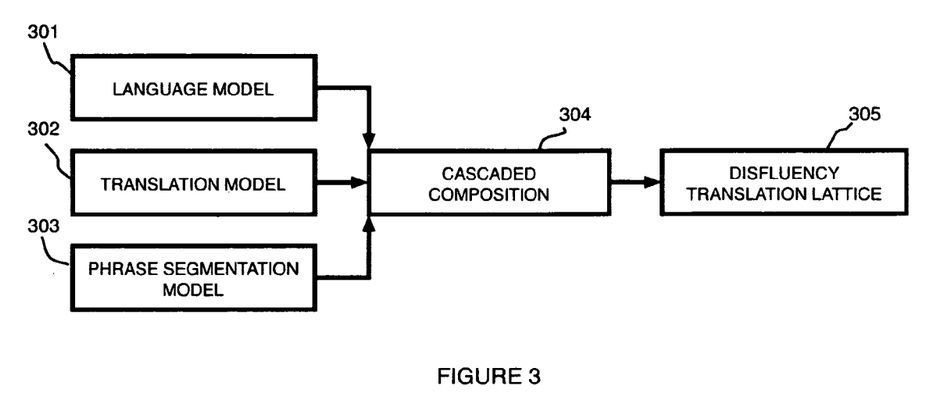
FIG. 3 is a flow chart of a method for creating a disfluency translation lattice according to an embodiment of the present disclosure.

Referring to FIG. 3, after building the language model (301), the translation model (302), and the phrase segmentation model (303), the WFSTs, a cascaded composition (304) of these finite state transducers is performed to obtain the disfluency translation lattice (305) that translates sequence of noisy words to a clean phrase.

$$T = P \circ N \circ L \quad (8)$$

Decoding

One of the reasons why WFST-based approaches are attractive is due to the availability of efficient methods for decoding and optimization. In this framework heterogeneous statistical information may be combined with a composition operation of transducers representing the different knowledge sources. The cascaded composition (see FIG. 3) generates a lattice that can segment and translate phrases in a globally optimal framework.

For decoding, the decoder (see FIGS. 1 and 2, block 104) uses a multilayer search method. Specifically, one layer is determined for each of the input FST (for example, see FIG. 3 blocks 301-303): the noisy input/acceptor, the translation model lattice, and the language model lattice. At each layer, the search process is performed via a state traversal procedure starting from a start state sr0, and consuming an input word in each step in a left-to-right manner. This can be viewed as an optimized version of on-the-fly or dynamic composition. However, specialized versions of composition have the advantage of not only having the potential of being many times faster than general composition implementations found in FST or finite state machine (FSM) toolkits, but also in incorporating information sources that cannot be easily or compactly represented using WFSTs. For example, the decoder can allow the application of translation length penalties and phrase penalties to score the partial translation candidates during search. In addition, the decoder can incorporate parameter values (e.g., language model weight) at runtime without the need for any modification of the input WFSTs.

Feature Extraction

One disadvantage of using WFST based translation method is a lack of simple feature based probabilistic training algorithm for WFSTs. According to an embodiment of the present disclosure, nominal features may be added for parameterization of WFSTs.

Nominal features are extracted for each word and are converted into a binary string. The binary string is appended to the end of each noisy word. For example, if $f_1, f_2$ were the binary features mentioned above each noisy word, n is appended with $f_1, f_2$ producing $n_{f_1, f_2}$. Adding too many features can increase data sparsity problems, such that the number and type of features should be controlled.

Evaluation

Corpus

A method according to an embodiment of the present disclosure was tested on a Penn III Switchboard tree bank corpus. Data was split into a training set of 1221502 words and a test set of 199520 words. Experiments were performed on manual transcripts. No sentence boundaries or interruption point information was assumed. Turn boundaries are assumed; in speech-to-speech translation systems the positions of turns as speakers take turns to speak are known. Memory was not the main concern in assuming the availability of turns. Since the model is not a feature-based model, no use turn boundary information was used to extract any feature that may provide unfair advantage to the model.

For training, the annotation for repeat, repair and filled pauses provided with the corpus was used. The switchboard annotation was converted to produce a parallel text corpus of clean and noisy speech transcripts where all the disfluent words in a noisy transcript align with disfluent token IDs. These disfluent token IDs signify the type of disfluency for the corresponding word in the noisy transcript as shown above. C was defined as the annotated clean corpus and N as the corresponding noisy parallel corpus.

Experiment and Results

In the experiment, two lexical features were extracted for all the 1.22 million words in corpus C. These feature values were appended to each word, obtaining a corpus CF. The two features extracted were "are part of speech tags of any of the next two words the same as the current one" and "are any of the next two words the same as the current word." To obtain the features based on part-of-speech, an automatic part-of-speech tagger was used. The training corpus had 13287 repair phrases with only 48 phrases longer than 5 words. Most of the disfluent phrases are composed of one or two words. 11.8% of all the phrases constitute more than 2 words.

All the parallel phrases were extracted from the corpora N and CF. The limit of phrase size was set to five words. A phrase dictionary with 2.85 million entries was obtained. Each entry includes a noisy phrase, corresponding clean phrase, and a probability of its translation. The translation probability was determined for each clean and noisy phrase pair. The transition probability was smoothed with a $\delta$ of 0.01.

TABLE 2

The Size of the Translation Lattice and LM

| Type | # of states | # of transitions |
| --- | --- | --- |
| Translation | 1,635,398 | 3,426,379 |
| LM | 234,118 | 1,073,678 |

The WFSTs were built and composed to produce a noisy to clean speech translation lattice. The language model was built using an IBM language model toolkit. The size of the final translation lattice is listed in Table 2.

When the model was tested on the held out test set, the results listed in Table 2 were obtained. The method was tested by using the precision, recall and F-measure. The scores were determined at the word level. The training and test data are heavily skewed with very few positive examples of disfluency. In the test set of 199520 words only 6.93% of words were disfluent, so F-measure is a reasonable metric for the system evaluation.

TABLE 3

Results on Held-out Test Set

| | Disfluency | Precision | Recall | F-measure |
| --- | --- | --- | --- | --- |
| without LM | REPEAT | 0.695 | 0.809 | 0.747 |
| | REPAIR | 0.479 | 0.256 | 0.334 |
| | FILLED PAUSE | 0.953 | 0.998 | 0.975 |
| with LM | REPEAT | 0.743 | 0.860 | 0.797 |
| | REPAIR | 0.509 | 0.331 | 0.401 |
| | FILLED PAUSE | 0.955 | 0.998 | 0.976 |

Two different types of translation lattices were built to examine the effects of language model. When the language model (LM) was added to the translation model that did not have LM information, the F-measure improved for repeats by 4.9%, precision by 4.8% and recall by 5.1%. Similarly for repairs, F-measure improved by 6.7%, precision by 3% and recall by 7.5%. The addition of LM only slightly improved filled pause results signifying that LM is more critical for detecting repeats and repairs than filled pauses. The improvement in F-measure and recall with the addition of LM for repairs is significantly higher than it is for repeat, possibly showing that taking account of surrounding word context is more important for repair detection. F-measure for repeat detection is 39.6% higher than F-measure for repair detection signifying the difficulty of repair detection. High recall of 0.86 was obtained as well as an F-measure of 0.797 for repeat detection.

The model and method were able to detect filled pauses with a greater accuracy than repeats and repairs. An F-measure of 0.976 was obtained for filled pause detection. One of the reasons that the same translation model does very well for filled pauses but not for repeat and repairs is because most of the filled pauses are unigrams and a few set of words constitutes most of the filled pauses. The most common filled pause in our test corpus was "uh" constituting 82.7% of all the filled pauses. The least occurring filled pauses were "ah", "anyway" that occurred only once.

Discoverability

A method for disfluency detection can be embedded as a sub-component of another system based on a phrase-level translation approach with WFSTs (for example, see FIGS. 1 and 2). The method has been incorporated into a MASTOR (Multilingual Automatic Speech-to-Speech Translator) system by having an additional option button. A user can click on the option button to incorporate the disfluency detection module (105) on the fly. Such an online integrated system may be implemented because the disfluency detection method is based on WFST and can be combined with the translation transducer (e.g., 107) with a composition operation It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
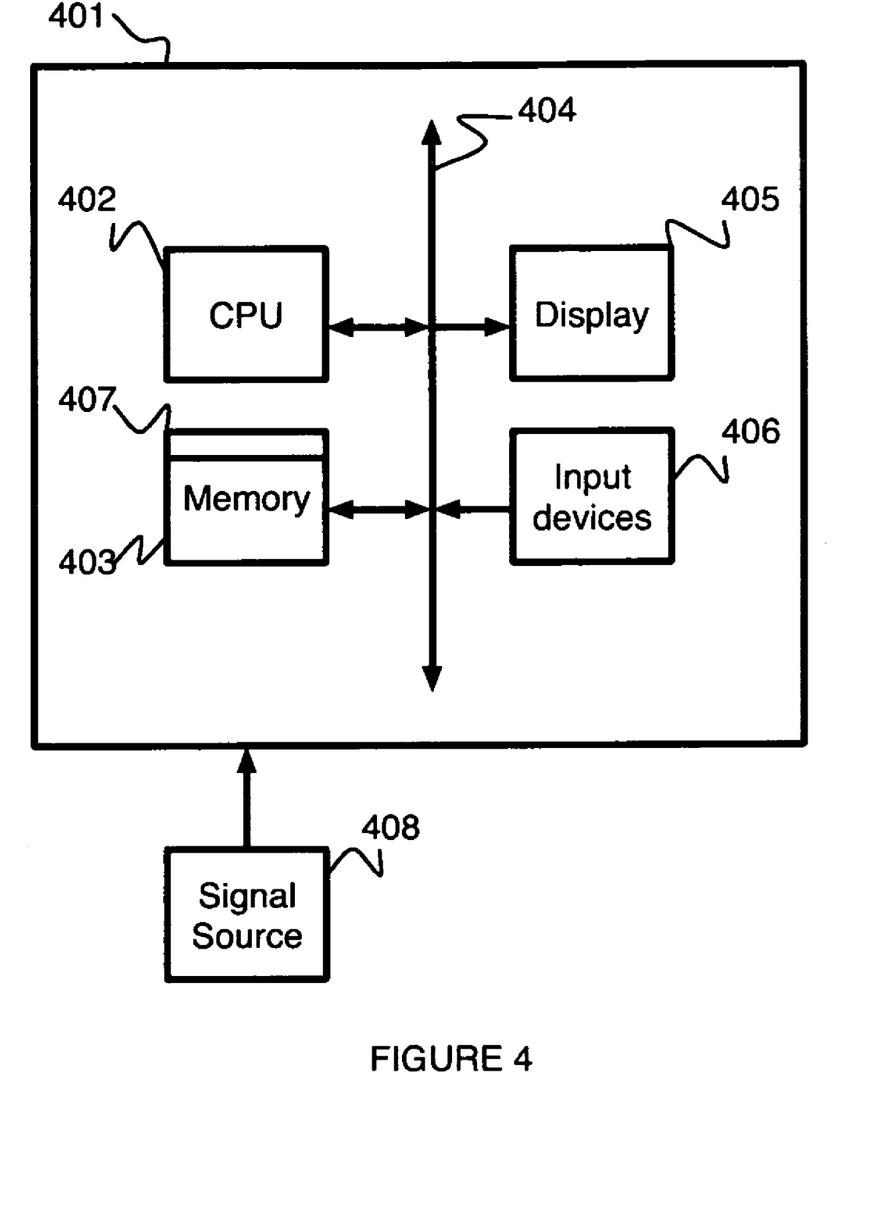
FIG. 4 is a diagram of a system according to an embodiment of the present disclosure.

Referring to FIG. 4, according to an embodiment of the present invention, a computer system (401) for implementing a method of disfluency detection can comprise, inter alia, a central processing unit (CPU) (402), a memory (403) and an input/output (I/O) interface (404). The computer system (401) is generally coupled through the I/O interface (404) to a display (405) and various input devices (406) such as a mouse and keyboard. The support circuits can include circuits such as cache, power supplies, clock circuits, and a communications bus. The memory (403) can include random access memory (RAM), read only memory (ROM), disk drive, tape drive, or a combination thereof. The present invention can be implemented as a routine (407) that is stored in memory (403) and executed by the CPU (402) to process the signal from the signal source (408). As such, the computer system (401) is a general-purpose computer system that becomes a specific-purpose computer system when executing the routine (407) of the present invention.

The computer platform (401) also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present disclosure, a method for disfluency detection is based on a phrase-level translation framework for detecting repeats, repairs and filled pauses. The method may use simplified phrase-level translation techniques by retokenization of words in the speech transcript such that fertility and alignment models are not needed. Features may be incorporated in a weighted finite state transducer. The method needs only a parallel corpora of noisy and clean speech transcripts reducing the amount of natural language resources needed for disfluency detection.

Having described embodiments for a system and method for disfluency detection, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A program storage device readable by computer-processor, tangibly embodying a program of instructions executable by the computer-processor to perform method steps for creating a disfluency translation lattice, the method steps comprising:

providing a plurality of weighted finite state transducers including a translation model, a language model, and a phrase segmentation model as input;

performing a cascaded composition of the weighted finite state transducers to create a disfluency translation lattice;

storing the disfluency translation lattice to a computer-readable media coupled to the computer-processor; and coupling the disfluency translation lattice to a decoder for receiving noisy speech and outputting clean speech corresponding to the noisy speech, wherein the clean speech is output comprising disfluent class label tokens replacing disfluent speech, and wherein the tokens include tags identifying different types of disfluency.

2. The program storage device of claim 1, wherein the cascaded composition fuses heterogeneous information of the weighted finite state transducers.

3. The program storage device of claim 1, wherein the type of disfluency indicates one of a repeat, a repair, and a filler.

4. The program storage device of claim 1, wherein the noisy speech has the same number of words as the clean speech.

5. A method for creating a disfluency translation lattice comprising:

providing a plurality of weighted finite state transducers including a translation model, a language model, and a phrase segmentation model as input;

performing a cascaded composition of the weighted finite state transducers to create a disfluency translation lattice;

storing the disfluency translation lattice to a non-transitory computer-readable medium; and coupling the disfluency translation lattice to a decoder for receiving noisy speech transcript and outputting clean speech transcript corresponding to the noisy speech transcript, wherein the clean speech transcript is output comprising disfluent class label tokens replacing disfluent speech, and wherein the tokens include tags identifying a type of disfluency, wherein the method is embodied in micro instruction code executed by a computer system.

6. The computer-implemented method of claim 5, wherein the cascaded composition fuses heterogeneous information of the weighted finite state transducers.

7. The computer-implemented method of claim 5, wherein the noisy speech transcript has the same number of words as the clean speech transcript, and wherein the tokens include tags identifying a type of disfluency.

8. The computer-implemented method of claim 7, wherein the type of disfluency indicates one of a repeat, a repair, and a filler.

9. The computer-implemented method of claim 5, wherein the noisy speech has the same number of words as the clean speech transcript.

10. A speech-to-speech translation system comprising:
a source speech input; and
a decoder embodied in micro instruction code and executed by a computer system for performing a translation from a language of the source speech input, including disfluency translation based on a weighted finite state transducer model, wherein clean speech is output comprising disfluent class label tokens replacing disfluent speech, and wherein the tokens include tags identifying a type of disfluency.

11. The speech-to-speech translation system of claim 10, further comprising a disfluency translation lattice coupled to the decoder.

12. The speech-to-speech translation system of claim 10, further comprising:
a source language model coupled to the decoder;
a target language model coupled to the decoder; and
a translation lattice coupled to the decoder.

13. The speech-to-speech translation system of claim 10, further comprising a text-to-speech module for receiving the target language speech in textual form and converting the target language speech in aural form.

* * * * *